(12) United States Patent
Almen

(10) Patent No.: US 6,390,415 B1
(45) Date of Patent: May 21, 2002

(54) WHEEL ROTATION DEVICE

(75) Inventor: Michael D. Almen, Rosamono, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/859,776

(22) Filed: May 17, 2001

(51) Int. Cl.$^7$ ................................................ B64C 25/40
(52) U.S. Cl. ...................................................... 244/103 S
(58) Field of Search ....................................... 244/103 S

(56) References Cited

U.S. PATENT DOCUMENTS 3,178,135 A * 4/1965 Moore ..................... 244/103 S
3,797,786 A * 3/1974 House ..................... 244/103 S
5,746,393 A * 5/1998 Gennaro ................... 244/103 S

* cited by examiner

Primary Examiner—J. Woodrow Eldred
(74) Attorney, Agent, or Firm—William G. Auton

(57) ABSTRACT

This invention relates to a system for reducing tire wear of an airborne vehicle that requires a runway upon which to land. A stream of air is naturally directed against a mechanical housing affixed to the wheels of the airborne vehicle, the device comprising a number of radially spaced surfaces symmetrically positioned about the housing and bolted to the existing wheel assembly. When the landing gear is in the extended position, natural air flow across the radially spaced surfaces causes the wheel to rotate at the equivalent to the landing speed of the aircraft, eliminating excessive wear on the tire, reducing stress on the landing gear assembly and resulting in a more controlled landing.

1 Claim, 3 Drawing Sheets

WHEEL ROTATION DEVICE

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to airplane landing wheels. It is well known that airplane wheels are necessitated to start rotating prior to landing of the craft, so as to prevent a blow out of the tire caused by the sudden contact against the stationary ground. Accordingly, numerous devices have been developed in the past for starting such wheel rotation, however, until now such are all subject to being improved.

Examples of excellent prior art systems are disclosed in the following U.S. Patents, the disclosures of which are incorporated herein by reference:

U.S. Pat. No. 4,383,665, May 17, 1983, Wind-driven rotating aircraft landing wheels, Maclean, Ewen M.
U.S. Pat. No. 3,773,283, Nov. 20, 1973, SELF ROTATING AIRPLANE TIRE, Abplanalp, Robert.
U.S. Pat. No. 3,529,792, May 1968, MacMahon.
U.S. Pat. No. 3,912,937, October, 1975, Lesser.

SUMMARY OF THE INVENTION

This invention relates to a system for reducing tire wear of an airborne vehicle that requires a runway upon which to land. A stream of air is naturally directed against a mechanical housing affixed to the wheels of the airborne vehicle, the device comprising a number of radially spaced surfaces symmetrically positioned about the housing and bolted to the existing wheel assembly. When the landing gear is in the extended position, natural air flow across the radially spaced surfaces causes the wheel to rotate at the equivalent to the landing speed of the aircraft, eliminating excessive wear on the tire, reducing stress on the landing gear assembly and resulting in a more controlled landing.

DESCRIPTION OF THE PREFERRED EMBODIMENT

The present invention provides an improved, wind-driven, rotating aircraft landing wheel wherein fins are used for catching the wind so as to rotate the wheel.

Figure 1:
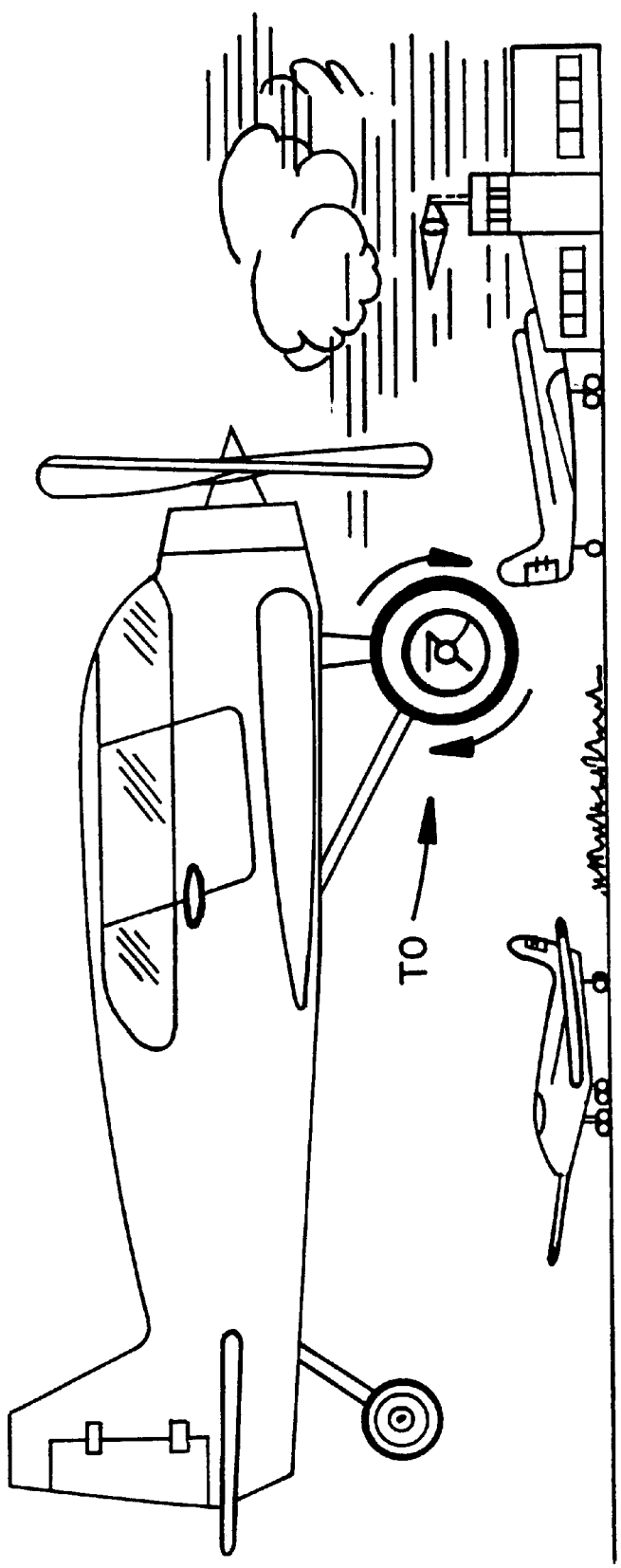
FIGS. 1 is a side view of an airplane coming in for a landing and the landing wheels, incorporating a wheel rotation system shown already rotating.

The reader's attention is now directed towards FIG. 1, which illustrates the prior art Maclean System. Maclean recognizes the advantages of prerotating the airplane wheel prior to landing the aircraft to reduce tire wear and stress on the landing gear.

Figure 2:
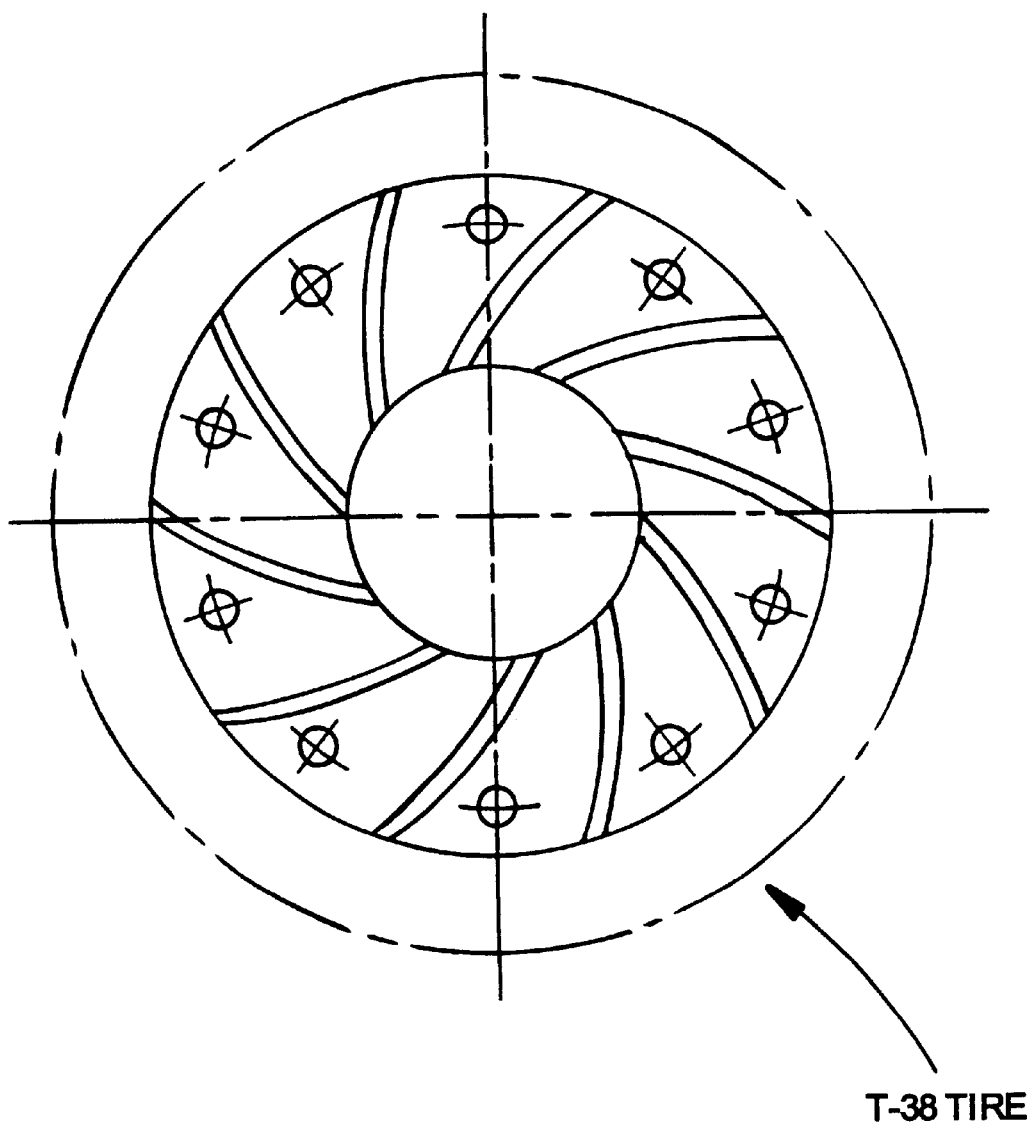
FIG. 2 is an enlarged side view of the wheel invention.
Figure 3:
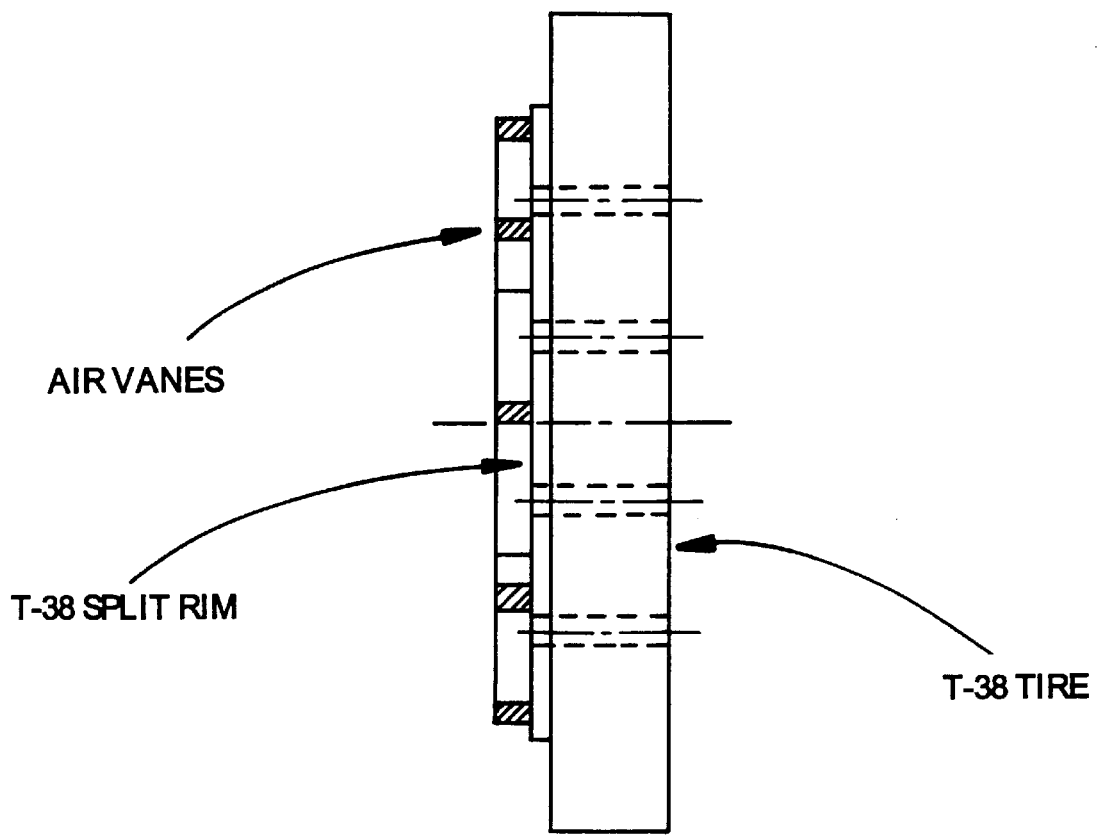
FIG. 3 is a front end view of the wheel invention.

FIGS. 2 and 3 illustrate the present invention as applied to the T-38 aircraft.

As mentioned above, this invention relates to a system for reducing tire wear of an airborne vehicle that requires a runway upon which to land. A stream of air is naturally directed against a mechanical housing affixed to the wheels of the airborne vehicle, the device comprising a number of radially spaced surfaces symmetrically positioned about the housing and bolted to the existing wheel assembly. When the landing gear is in the extended position, natural air flow across the radially spaced surfaces causes the wheel to rotate at the equivalent to the landing speed of the aircraft, eliminating excessive wear on the tire, reducing stress on the landing gear assembly and resulting in a more controlled landing.

The dimensions in the drawing of FIGS. 2 and 3 were taken off of a T-38 main landing gear tire and rim assembly, the dimensions will vary with the different types of aircraft due to bolt hole pattern and height of radial spaced surfaces so not to damage wheel well bulkhead. The radial surfaces might have to be longer or shorter to receive ground speed rotation or the radius of the vein might have to be changed. We were able to get to the wheel assembly of a T-38 while it was on jacks and the wheel assembly rotated with no effort at all. The F-16 changes its tires every 30 days. This device would hopefully extend that to every 90 days or greater. This device could benefit the Air Force and reduce the cost of tire replacement and wear on the landing gear assembly along with greater control during landing.

FIGS. 2 and 3 show a set of ten 0.375 inch thick air vanes symmetrically displaced about the T-38 wheel rim assembly. These vanes are curved with a 36 degree Curve with respect to the radial of the center of the T-38 wheel rim and have been shown to cause the wheel to rotate at the equivalent of the landing speed when turned by the airflow upon landing.

The wheel assembly of FIGS. 2 and 3 has ten bolt holes between the vanes. These bolt holes allow the assembly to be bolted onto identical holes of the existing T-38 wheel rim.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. A wind-driven, self-rotating aircraft landing wheel assembly which may be bolted to preselected aircraft wheel rims which have a distribution of wheel rim bolts displaced in a symmetrical pattern of dimensions and placement, said wind-driven, self-rotating aircraft landing wheel assembly comprising:

a rim frame which has a pattern of distribution of boltholes that match the dimensions and placement of the distribution of wheel rim bolts of the preselected aircraft rim so that the rim frame may be bolted to the preselected aircraft rim; and a set of radially spaced airvanes which are placed on said rim frame with vane positions that catch a natural air flow when a landing gear is extended and which rotate the aircraft wheel thereby, wherein said set of radially spaced airvanes comprise ten symmetrically displaced vanes which extend from the rim frames and which have a 36 degree curve with respect to a radial vector from a center of the rim frame.

* * * * *